US012503909B2

(12) United States Patent
Couturier

(10) Patent No.: US 12,503,909 B2
(45) Date of Patent: Dec. 23, 2025

(54) MAGNETIC LOUVER BLIND STRUCTURE IN A DOUBLE-GLAZED WINDOW UNIT

(71) Applicant: UNICEL ARCHITECTURAL CORP., Longueuil (CA)

(72) Inventor: Vincent Couturier, Longueuil (CA)

(73) Assignee: UNICEL ARCHITECTURAL CORP., Longueuil (CA)

(*) Notice: Subject to any disclaimer, the term of this patent is extended or adjusted under 35 U.S.C. 154(b) by 522 days.

(21) Appl. No.: 17/577,905

(22) Filed: Jan. 18, 2022

(65) Prior Publication Data

US 2022/0228430 A1 Jul. 21, 2022

Related U.S. Application Data

(60) Provisional application No. 63/138,568, filed on Jan. 18, 2021.

(51) Int. Cl.
*E06B 9/264* (2006.01)
*E06B 9/322* (2006.01)

(52) U.S. Cl.
CPC .............. *E06B 9/264* (2013.01); *E06B 9/322* (2013.01); *E06B 2009/2646* (2013.01)

(58) Field of Classification Search
CPC ... E06B 2009/2646; E06B 9/264; E06B 9/322
See application file for complete search history.

(56) References Cited

U.S. PATENT DOCUMENTS

| | | | | |
|---|---|---|---|---|
| 361,019 A * | 4/1887 | Morstatt | E06B 7/084 | 292/345 |
| 421,047 A * | 2/1890 | Hantsche, Jr. | E06B 7/084 | 49/82.1 |
| 2,607,452 A * | 8/1952 | Hall | E06B 7/084 | 49/82.1 |
| 2,903,257 A * | 9/1959 | Perrone | E06B 7/084 | 49/338 |
| 3,201,832 A * | 8/1965 | Hordis et al. | E06B 9/264 | 310/104 |
| 3,253,644 A * | 5/1966 | Kazuo | E06B 9/264 | 49/64 |
| 3,685,205 A * | 8/1972 | Requena | E06B 9/264 | 49/82.1 |

(Continued)

*Primary Examiner* — Abe Massad
*Assistant Examiner* — John W Hanes, Jr.
(74) *Attorney, Agent, or Firm* — PRAXIS

(57) ABSTRACT

A louver-blind double glazed window unit comprises a frame defining first and second faces of the unit with respective first and second windows mounted thereto, and outer side and inner sides. An inner chamber is defined between the frame and the first and second windows. Louvers extend within the chamber and are pivotally mounted to the frame. An actuator assembly is positioned within an operating part of the frame for pivoting the louvers between open and closed positions. An inner magnet is positioned at the inner side of the frame. An external manual operator is movably positioned on the outer side of the frame and comprises an outer magnet magnetically communicating with the inner magnet.
Moving the external manual operator along the outer side of the frame causes the inner magnet to move in tandem therewith thereby actuating the actuator assembly to pivot the plurality of louver members.

6 Claims, 5 Drawing Sheets

(56) References Cited

U.S. PATENT DOCUMENTS

| | | | | | |
|---|---|---|---|---|---|
| 3,991,518 | A * | 11/1976 | Ishihara | E06B 7/08 | 160/90 |
| 4,588,012 | A * | 5/1986 | Anderson | E06B 9/264 | 160/174 R |
| 4,611,648 | A * | 9/1986 | Anderson | E06B 9/264 | 49/64 |
| 5,216,837 | A * | 6/1993 | Cleaver | E06B 7/086 | 49/82.1 |
| 5,282,504 | A * | 2/1994 | Anderson | E06B 9/52 | 49/64 |
| 5,379,551 | A * | 1/1995 | Swapp | E06B 7/084 | 49/82.1 |
| 5,580,307 | A * | 12/1996 | Arosio | F24F 13/15 | 49/82.1 |
| 6,014,839 | A * | 1/2000 | Ruggles | E06B 7/086 | 327/307 |
| 6,094,864 | A * | 8/2000 | Hsu | E06B 7/096 | 49/82.1 |
| 6,536,162 | B2 * | 3/2003 | LaMay | E06B 7/086 | 49/74.1 |
| 7,124,537 | B2 * | 10/2006 | Young | E06B 7/084 | 49/90.1 |
| 7,201,205 | B2 * | 4/2007 | Lyness | E06B 9/264 | 160/34 |
| 7,337,824 | B2 * | 3/2008 | Berger | E06B 9/264 | 160/107 |
| 7,353,636 | B1 * | 4/2008 | Anderson | E06B 7/086 | 49/82.1 |
| 7,389,609 | B2 * | 6/2008 | Yorgason | E06B 7/096 | 49/82.1 |
| 7,669,633 | B2 * | 3/2010 | Berger | E06B 9/30 | 160/107 |
| 8,533,996 | B1 * | 9/2013 | Stone | E06B 7/096 | 49/82.1 |
| 8,733,018 | B2 * | 5/2014 | Couturier | E06B 9/264 | 49/63 |
| 8,857,106 | B2 * | 10/2014 | Colson | E06B 7/096 | 49/82.1 |
| 9,038,314 | B2 * | 5/2015 | Chen | E06B 7/09 | 49/82.1 |
| 9,631,426 | B1 * | 4/2017 | Caspa | E06B 9/368 | |
| 9,695,631 | B2 * | 7/2017 | Huang | E06B 9/327 | |
| 9,877,928 | B2 * | 1/2018 | Tinsley | A61K 31/05 | |
| 10,294,713 | B2 * | 5/2019 | Holford | E06B 7/09 | |
| 10,604,998 | B2 * | 3/2020 | Greene | G09F 5/02 | |
| 11,047,168 | B2 * | 6/2021 | Hsu | F16H 37/04 | |
| 11,293,219 | B2 * | 4/2022 | Zhang | E06B 9/264 | |
| 11,326,392 | B2 * | 5/2022 | Tostee | E06B 7/09 | |
| 11,624,233 | B2 * | 4/2023 | Zhang | E06B 3/663 | 160/130 |
| 2005/0076569 | A1 * | 4/2005 | Griffiths | E06B 7/096 | 49/82.1 |
| 2005/0263255 | A1 * | 12/2005 | Phoy | E06B 9/264 | 160/98 |
| 2014/0020851 | A1 * | 1/2014 | Ouzts | E06B 9/264 | 160/127 |
| 2014/0209256 | A1 * | 7/2014 | Zhang | E06B 9/264 | 160/107 |
| 2016/0024841 | A1 * | 1/2016 | Yeh | F16H 19/0622 | 60/527 |
| 2016/0237741 | A1 * | 8/2016 | Greene | E06B 9/32 | |
| 2016/0340974 | A1 * | 11/2016 | Huang | E06B 9/327 | |
| 2017/0009520 | A1 * | 1/2017 | Zheng | E06B 9/264 | |
| 2017/0107757 | A1 * | 4/2017 | Huang | E06B 9/386 | |
| 2017/0175438 | A1 * | 6/2017 | Nicolosi | E06B 9/307 | |
| 2018/0030776 | A1 * | 2/2018 | Vaidya | E06B 3/549 | |
| 2018/0298681 | A1 * | 10/2018 | Hall | E06B 9/322 | |
| 2020/0284091 | A1 * | 9/2020 | Turner | E06B 7/096 | |
| 2021/0131174 | A1 * | 5/2021 | Zhang | E06B 3/663 | |
| 2022/0228430 | A1 * | 7/2022 | Couturier | E06B 9/322 | |

* cited by examiner

MAGNETIC LOUVER BLIND STRUCTURE IN A DOUBLE-GLAZED WINDOW UNIT

CROSS-REFERENCE TO RELATED APPLICATIONS

The present application claims priority on U.S. Provisional Patent Application Ser. No. 63/138,568 filed on Jan. 18, 2021 and incorporated herein by reference in its entirety.

TECHNICAL FIELD

The present disclosure generally relates to a louver blind structure in a double-glazed window unit. More particularly, but not exclusively, the present disclosure relates to a louver structure including a magnetic actuation system for causing louvers of a louver blind structure to pivot between open and closed positions.

BACKGROUND

Louver blind structures are well known in the art. These structures are located within the inner chamber of a window unit and include a plurality of louver members or slat members which are equally spaced and horizontally disposed. The louver member can pivot from a vertical position slightly overlapping one another to form a uniform vertical surface that blocks light from streaming therethrough. The louver members can also be pivoted into a horizontal position in order to let light pass between adjacent and spaced apart louver members. The actuation systems for causing louvers of a louver blind structure to pivot between open and closed positions include a gear system mechanically in contact with the louvers and connected to outer control such as a tilt rod, a switch and the like.

Objects

It is an object of the present disclosure to provide a louver blind structure.

It is an object of the present disclosure to provide louver blind structure in a double-glazed window unit.

It is an object of the present disclosure to provide a kit for a louver blind structure.

SUMMARY

In accordance with an aspect of the disclosure there is provided a louver-blind double glazed window unit comprising: a frame structure defining first and second faces of the unit, and outer side and inner sides; a first window mounted to the first face of the unit and a second window mounted to the second face of the unit, an inner chamber defined between the frame structure and the first and second windows; a plurality of louver members extending within the chamber and pivotally mounted to the frame; an actuator assembly positioned within the chamber and being in operative communication with the plurality of louver members for imparting a pivot movement thereto between open and closed positions thereof and comprising an inner magnet positioned at the inner side of the frame structure; and an external manual operator movably positioned on the outer side of the frame structure and comprising an outer magnet interfacing with the inner magnet via the frame structure for magnetic communication therewith, wherein a movement of the external manual operator along a length of the outer side of the frame causes the inner magnet to move in tandem with the outer magnet actuating the actuator assembly to impart the pivot movement to the plurality of louver members.

In accordance with an aspect of the disclosure there is provided a louver-blind structure for a double-glazed window unit comprising a frame structure defining first and second faces of the unit, and outer side and inner sides, a first window mounted to the first face of the unit and a second window mounted to the second face of the unit; and an inner chamber defined between the frame structure and the first and second windows, the structure comprising: a plurality of louver members for extending within the chamber and for being pivotally mounted to the frame; an actuator assembly for being positioned within the chamber and being in operative communication with the plurality of louver members for imparting a pivot movement thereto between open and closed positions thereof and comprising an inner magnet positioned at the inner side of the frame structure; and an external manual operator for being movably positioned on the outer side of the frame structure and comprising an outer magnet for interfacing with the inner magnet via the frame structure for magnetic communication therewith, wherein a movement of the external manual operator along a length of the outer side of the frame causes the inner magnet to move in tandem with the outer magnet actuating the actuator assembly to impart the pivot movement to the plurality of louver members.

In accordance with an aspect of the disclosure there is provided a louver-blind structure for a double-glazed window unit comprising a frame structure defining a kit for a louver-blind double glazed window unit, the kit comprising: a frame structure defining first and second faces of the unit, and outer side and inner sides; a first window for being mounted to the first face of the unit and a second window for being mounted to the second face of the unit, an inner chamber defined between the frame structure and the first and second windows when assembled; a plurality of louver members for extending within the chamber and for being pivotally mounted to the frame; an actuator assembly for being positioned within the chamber and for being in operative communication with the plurality of louver members for imparting a pivot movement thereto between open and closed positions thereof and comprising an inner magnet for being positioned at the inner side of the frame structure; and an external manual operator for being movably positioned on the outer side of the frame structure and comprising an outer magnet interfacing with the inner magnet via the frame structure for magnetic communication therewith, wherein a movement of the external manual operator along a length of the outer side of the frame causes the inner magnet to move in tandem with the outer magnet actuating the actuator assembly to impart the pivot movement to the plurality of louver members.

In an embodiment, movement of the external manual operator along one direction of the length of the outer side of the frame causes the actuator assembly to impart the pivot movement to the louver members to the open direction and movement of the external manual operator along another opposite direction of the length of the outer side of the frame causes the actuator assembly to impart the pivot movement to the louver members to the open direction.

In an embodiment, the actuator assembly comprises: a movable structure comprising a carrier body for carrying the inner magnet and a rack extending therefrom, a gear assembly in operative engagement with the rack; a movable louver rack in operative engagement with the gear assembly with the plurality of the louver members; wherein movement of the inner magnet in tandem with the outer magnet causes the movable structure to move therewith providing for the rack to movably engage the gear assembly causing the gear assembly to movably engage the louver rack thereby imparting the pivot movement to the louver members. In an embodiment, the gear assembly comprises a first gear in operative engagement with the rack and a second gear in operative engagement with the first gear and with the louver rack. In an embodiment, the plurality of louver members comprises respective louver gears operatively engaged by the louver rack. In an embodiment, the louver rack comprises teeth for operatively engaging the louver gears.

Other objects, advantages and features of the present disclosure will become more apparent upon reading of the following non-restrictive description of illustrative embodiments thereof, given by way of example only with reference to the accompanying drawings.

The appended drawings form part of the disclosure.

DETAILED DESCRIPTION OF ILLUSTRATIVE EMBODIMENTS

Generally stated and in accordance with an embodiment, there is provided a louver-blind double glazed window unit comprising a frame structure defining first and second faces of the unit, and outer side and inner sides. A first window is mounted to the first face of the unit and a second window is mounted to the second face of the unit. An inner chamber is defined between the frame structure and the first and second windows. A plurality of louver members extends within the chamber and are pivotally mounted to the frame. An actuator assembly is positioned within the chamber and is in operative communication with the plurality of louver members for imparting a pivot movement thereto between open and closed positions. An inner magnet is positioned at the inner side of the frame structure. An external manual operator is movably positioned on the outer side of the frame structure and comprises an outer magnet interfacing with the inner magnet via the frame structure for magnetic communication therewith. A movement of the external manual operator along a length of the outer side of the frame causes the inner magnet to move in tandem with the outer magnet actuating the actuator assembly to impart the pivot movement to the plurality of louver members.

With reference, to the appended Figures, non-restrictive illustrative embodiments will be herein described so as to further exemplify the disclosure only and by no means limit the scope thereof.

Figure 1:
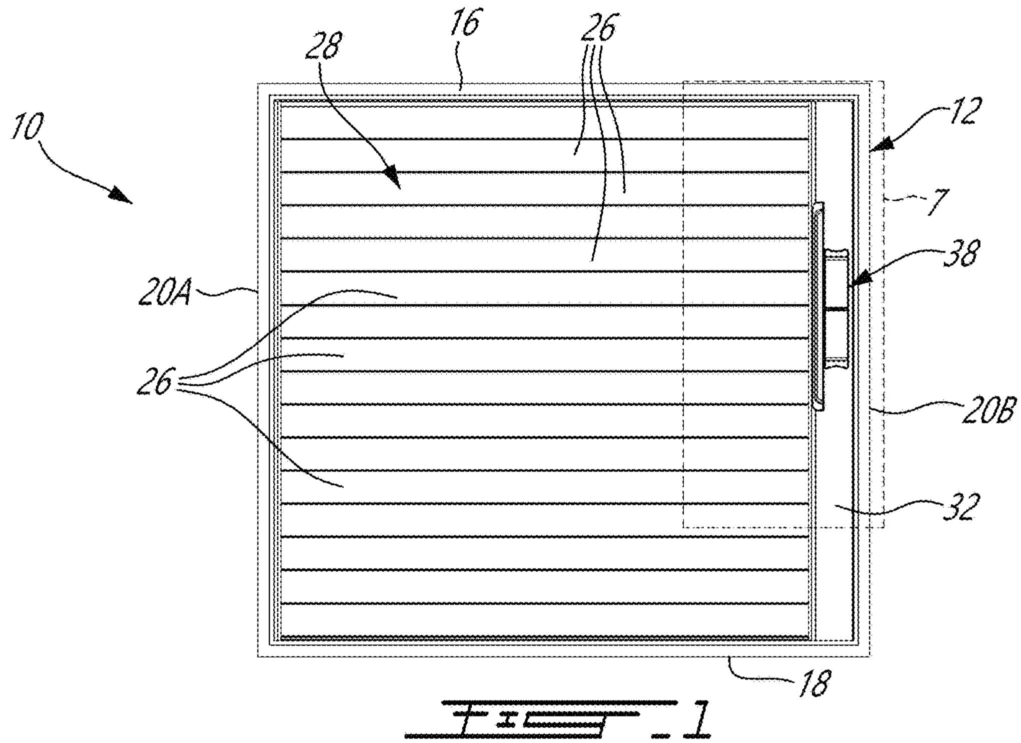
FIG. 1 is a front view of a double-glazed window with a louver blind structure in accordance with a non-restrictive illustrative embodiment of the present disclosure.
Figure 2:
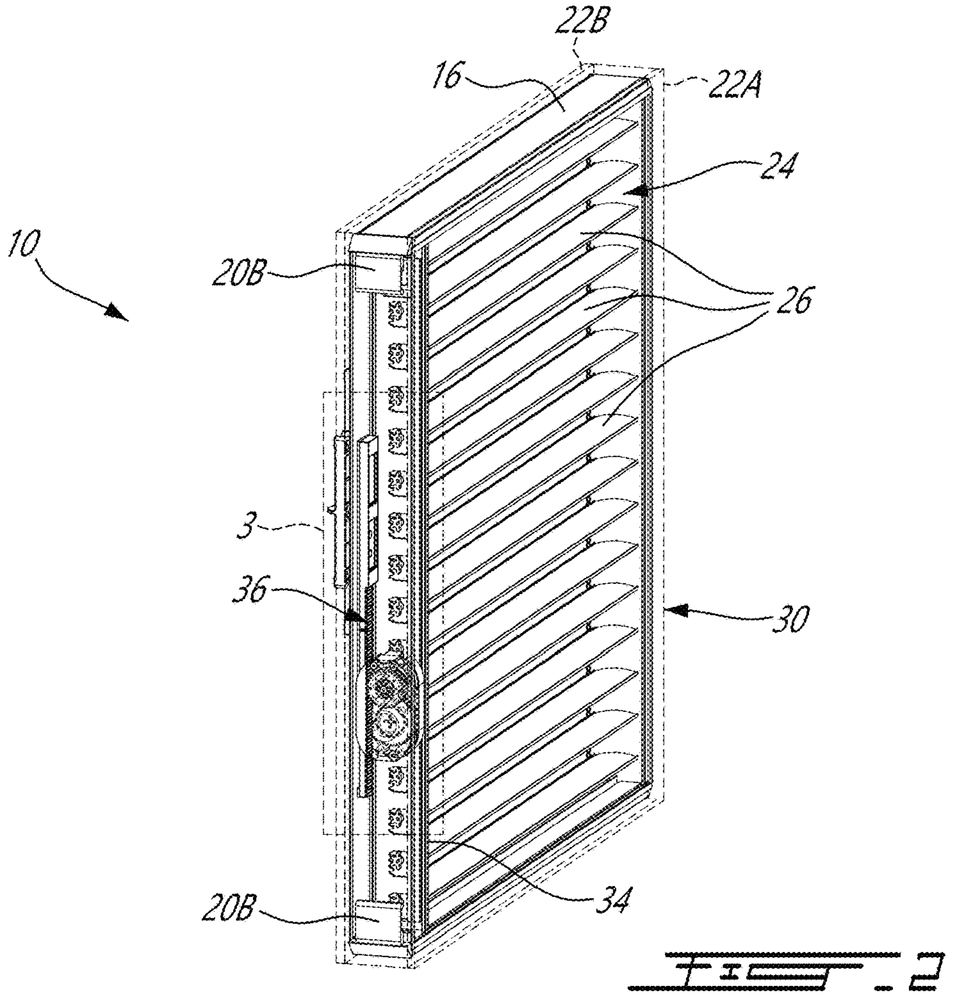
FIG. 2 is a side and rear perspective view of the double-glazed window of FIG. 1 exposing the actuator assembly of the louver blind structure in in accordance with a non-restrictive illustrative embodiment of the present disclosure.

FIGS. 1 and 2 show a double-glazed window unit 10 including a frame 12 with a louver blind structure 14 mounted thereto. The frame 12 has top and bottom members 16 and 18, respectively, and opposite lateral members 20A and 20B. The lateral member 20B in the example shown in FIG. 2 is partially removed. First and second window panels 22A and 22B, respectively, are mounted to the frame 12 defining together with the frame 12 a chamber 24. The louver blind structure 14 includes a plurality of louver members 26 positioned within the chamber 24 and extending horizontally between the spaced apart lateral members 20A and 20B and being pivotally mounted thereto so as to be moved between open and closed positions. In an embodiment, the louver members 26 are not interconnected by ropes, strings, pulleys, beads and the like. The double-glazed window unit 10 defines an inner face 28 forming part of the inner part of a building structure and an outer face 30 forming part of the outer part of this building structure.

In another non-illustrated embodiment, the louver members 26 are vertical slats extending between the top and bottom members 16 and 18, respectively and being pivotally mounted thereto for being pivoted between open and closed positions. According, the double-glazed window unit 10 of the present disclosure provides for both horizontal and vertical louver members as will be further discussed herein.

Figure 3:
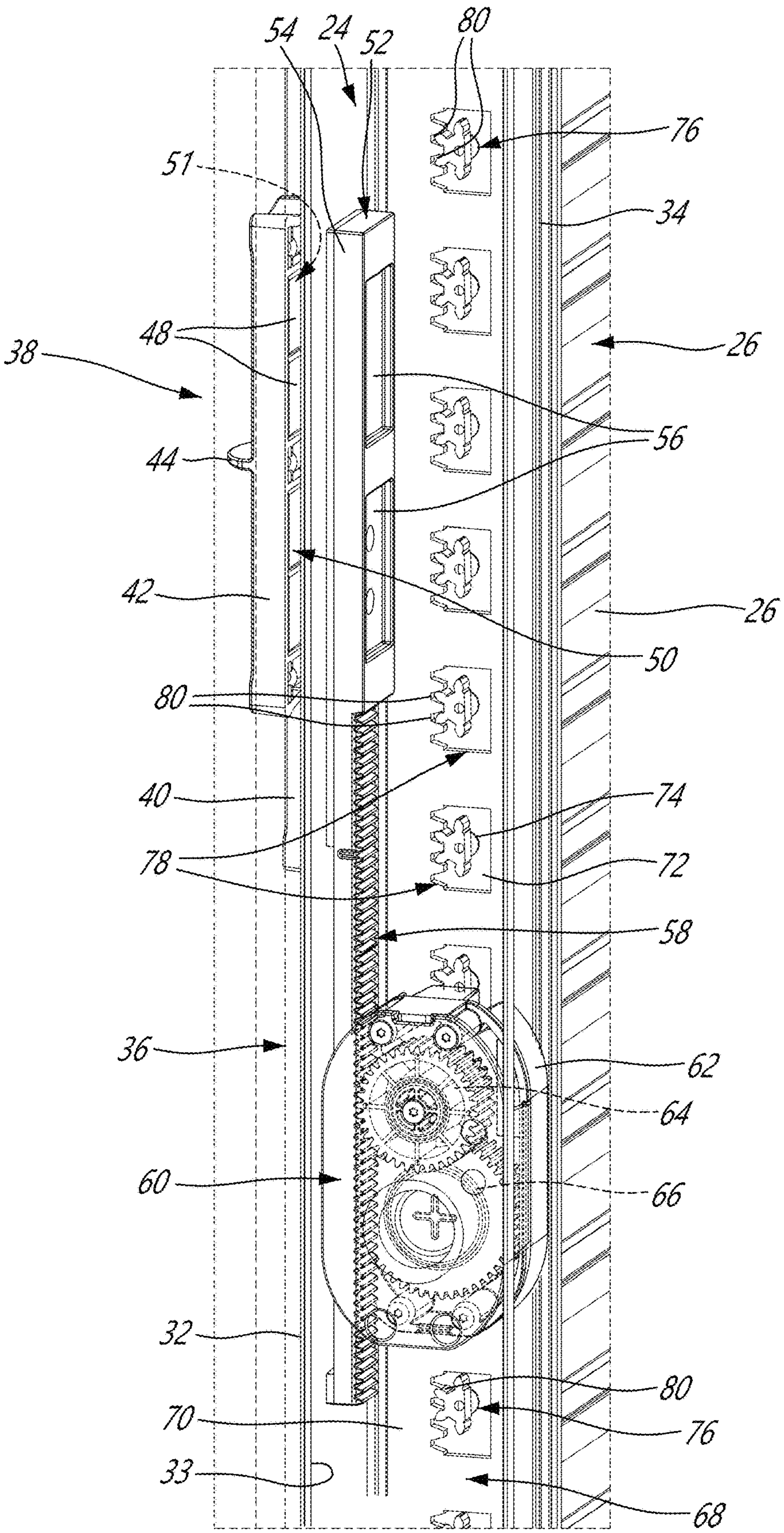
FIG. 3 is an enlarged view of the portion 3 of FIG. 2.

The frame 12 also includes a narrow vertical panel 32 at the inner face 28 and vertical side panel 34 at the outer face 30. Both panels 32 and 34 are adjacent and contiguous with lateral side member 20B. In another embodiment, the panels are adjacent and contiguous with the lateral side 20A. Indeed, and as will be appreciated by the skilled artisan, the left and rights sides of the frame 12 are interchangeable as will be further explained herein. In another non-illustrated embodiment, when using vertical slats, the unit frame includes horizontal narrow panels rather than vertical narrow panels at the inner and outer faces thereof that can be adjacent either the top or bottom frame sides 16 and 18, respectively The unit 10 comprises an actuation assembly 36 positioned between panels 32 and 34 as shown in FIGS. 2 and 3. Thus, depending on whether the panels 32 and 34 are located at the left or the right of the frame 12 as explained above, the actuation assembly 36 will be positioned on the left or the right of the frame depending on the preference of the end user. In an example of a vertical slat unit, the frame 12 can be rotated to position side 20B at the bottom (forming the bottom side of the frame) or the top (forming the top side of the frame 12) and thus the actuation assembly 36 can be positioned between the narrow panels at the bottom or the top of the unit 10 as per the preference of the end user.

The actuation assembly 36 is in operative magnetic communication with a manual operator 38 for moving along a length of the panel 32. In this example the manual operator 38 is moved along a vertical length of the panel 32. When using vertical slats as explained above, the manual operator 38 is moved along a horizontal length of the narrow panel positioned on the inner side 28 of the unit adjacent the top or bottom end of the frame. In an embodiment, the manual operator 38 is mounted directly onto the panel 32. In this case, the window panel 22A is not positioned above the panel 32. In another embodiment, the window panel 22A is positioned on the panel 32 and the operator 38 is mounted on the window panel portion 21 (see FIG. 7) covering the panel 32.

Figure 7:
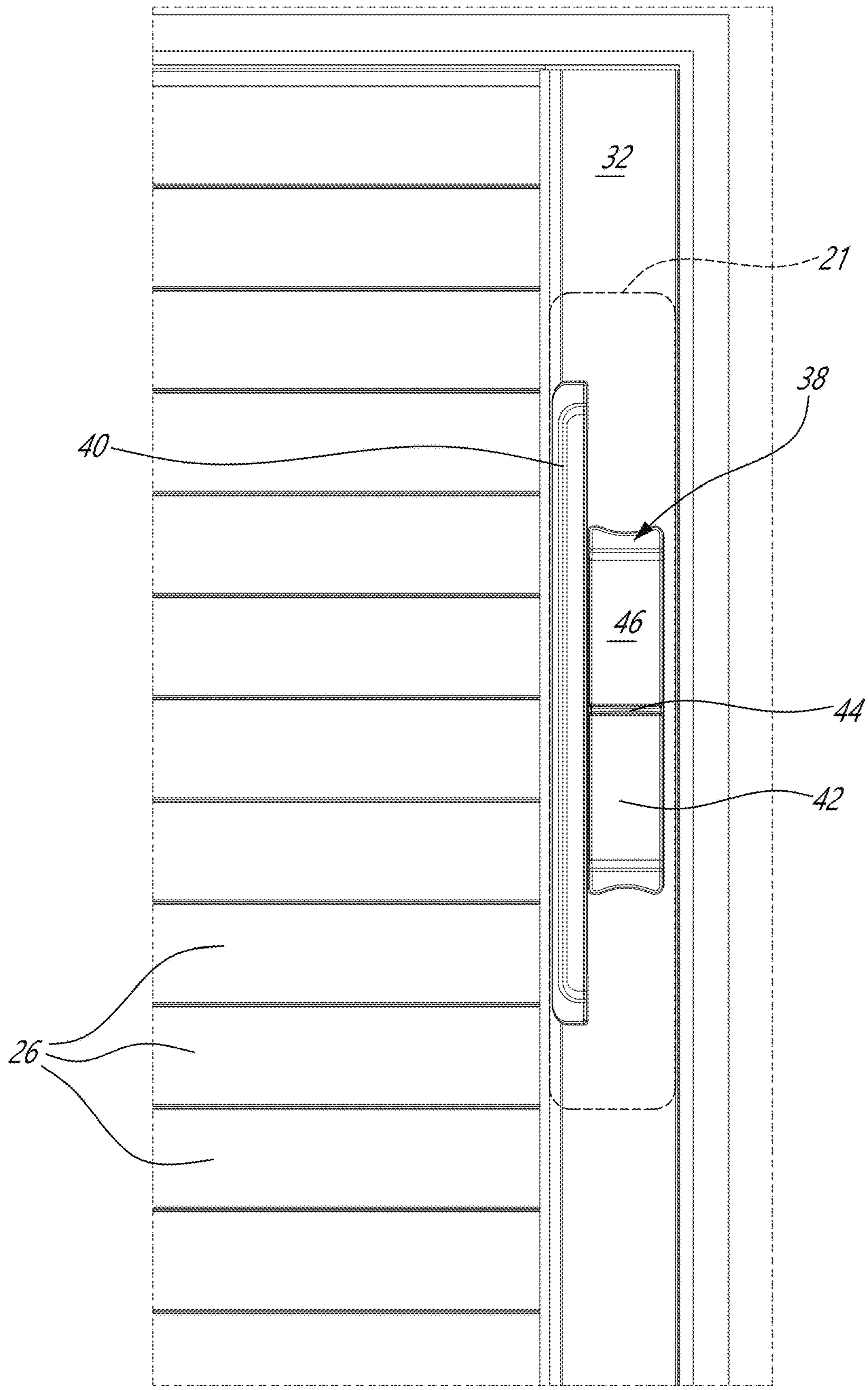
FIG. 7 is an enlarged view of portion 7 of FIG. 1.

Turning now to FIG. 7, the operator 38 includes a rail element 40 that is directly mounted to the window portion 21 or directly on the panel 32. A movable member 42 is slidable mounted to the rail element 40 to slide along the length thereof. In this example it is a vertical length, but if the slats were to be vertically positioned as explained above, the operator 38 would slide horizontally along the rail element. The movable member 42 includes a tab 44 on its exposed face 46 and magnets 48 at is undersurface 50 (see FIG. 3). The underside 50 includes sockets 51 for fitting the magnets 48 therein. Undersurface 50 slides along the window portion 21 or directly on the panel 32 or slightly above the surface it overlies. Thus, the user pushes the tab 44 to slide the movable member 42 upwardly or downwardly along the length the rail element 40. When using vertical slat, the movable member 42 is moved leftwards and rightwards along the horizontally disposed rail element 40.

With reference to FIGS. 3, 4, 5 and 6, the actuation assembly 36 will be described in further detail in accordance with a non-restrictive illustrative embodiment of the present disclosure.

The actuation assembly includes an inner movable structure 52 positioned within the chamber 24 between panels 32 and 34. The inner movable structure 52 is movably mounted to the inner surface 33 of the panel 32 for movement along the length thereof in tandem with the operator 38. The inner movable structure 52 comprises a carrier body 54 carrying magnets 56 that interface with magnets 48 through the panel 32 or the window portion 21 and panel 32 combination for magnetic attraction therebetween. Indeed, the movement of the movable member 42 moves the carrier body 54 in tandem therewith due to this magnetic attraction between magnets 48 and 56.

Figure 4:
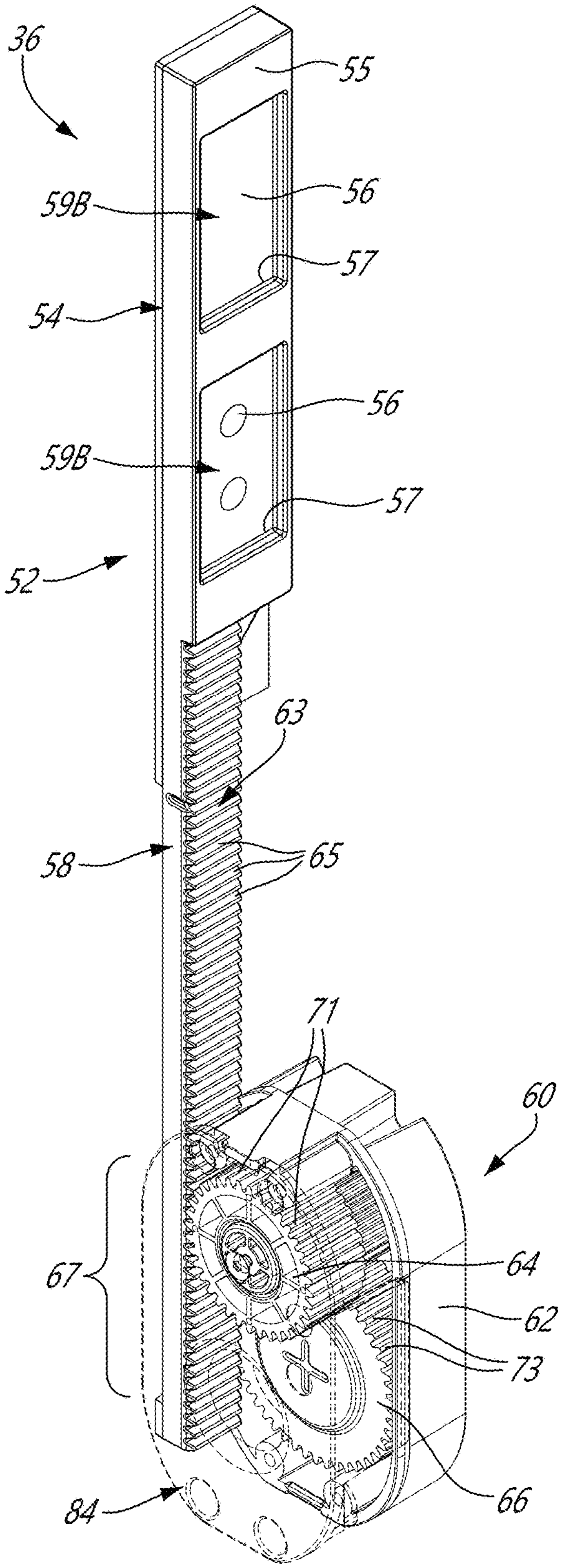
FIG. 4 is a perspective side and rear view of a portion of the actuator assembly of FIG. 2 in accordance with a non-restrictive illustrative embodiment of the present disclosure.
Figure 5:
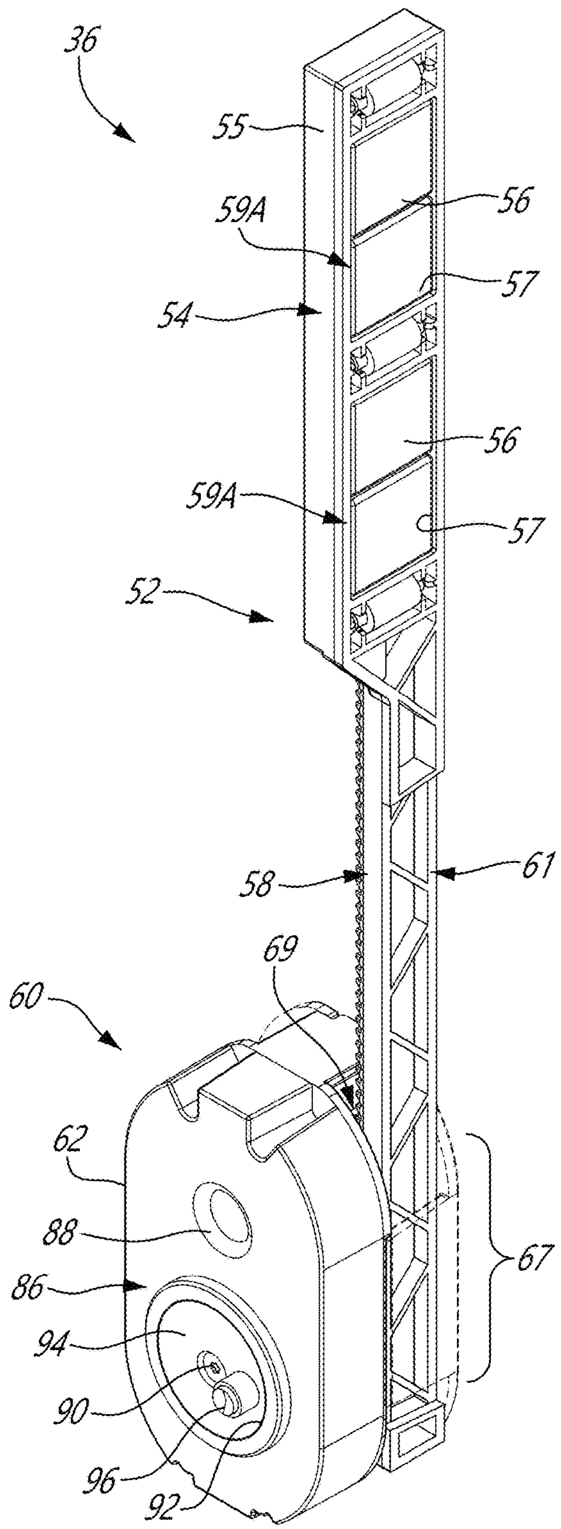
FIG. 5 is a perspective side and front view of the portion of the actuator assembly of FIG. 4 in accordance with a non-restrictive illustrative embodiment of the present disclosure.

With particular reference to FIGS. 4 and 5, the carrier body 54 comprises a frame 55 defining a pair of sockets 57 for fitting the magnets 56 therein. The frame 55 forms front and rear openings 59A and 59B for exposing the magnets 56.

With reference to FIGS. 3, 4 and 5 a rack 58 extends from the carrier body 54 and is in operational engagement with a gear assembly 60.

The gear assembly 60 includes a housing 62 mounted to the lateral side 20B and housing a first or upper gear 64 and a second or lower gear 66 that is engaged by the first gear 64 and that interferes with a rack 68 as will be further explained below. The rack 58 has a front face 61 and a rear face 63 with teeth 65. A distal or lower part 67 of the rack 58 is positioned within a side slot 69 of the housing 62 that exposes the first gear 64 so that the teeth 65 of the rack 58 engage the teeth 71 of the first gear 64. The second gear 66 is inwardly positioned relative to the first gear 64 so as not be engaged by the lower part 67 of the rack 58 and to only be engaged by the first gear 64. More specifically, the teeth 71 of the first gear 64 engage the teeth 73 of the second gear 66.

Therefore, as the rack 58 is reciprocally moved upwardly and downwardly it causes the first gear 64 to reciprocally rotate as it engages the second gear 66 causing this gear to rotate in tandem with the first gear 64. In units using vertical slats described above, instead of reciprocally moving the rack 58 along a vertical length it is moved along a horizontal length (i.e., leftwards, or rightwards as described above).

The housing 62 includes an outer side 84 interfacing the frame 12 and an inner side 86 interfacing with the rack 68. The first and second gears are 64 and 66 are respectively pivotally connected to the housing 62 via pivot connections 88 and 90 (shown at the inner side 86). The second gear 66 is in contact with the rack 68 at the inner side 86 moving it upwardly and downwardly therewith as it rotates in either direction about a pivot axis defined by the pivot connection 90. The housing 62 defines an opening 92 at its inner side 86 for exposing an inner side 94 of the second gear 66. A tab 96 extends from the inner side and interferes with the rack 68 as will be described further below.

Figure 6:
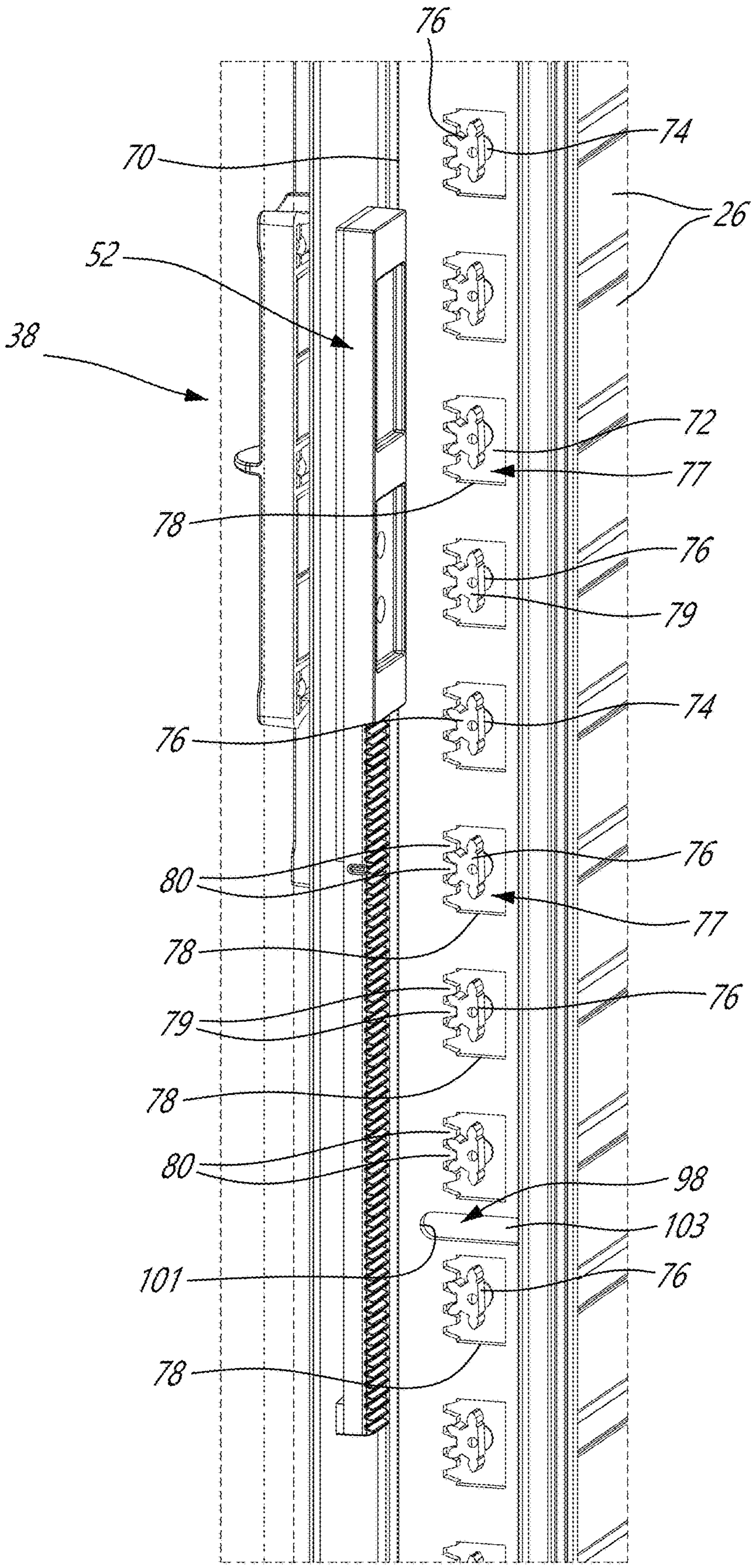
FIG. 6 is the same view of FIG. 3 without the gear assembly of the actuator assembly.

With reference to FIGS. 3 and 6, the rack 68 comprises a longitudinal flat body 70 that extends the length of the series of louvers engaging each of the louvers 26. Body 70 is vertical in this example but can also be horizontally positioned for units with vertical slats. The long flat body vertical body 70 extends along the length of an internal frame support 72 which has holes 74 for receiving louver pivot gears 76 therethrough. Each louver 26 is thus pivotally mounted to the internal frame support 72 with their respective pivot gears 76 extending therethrough. The vertical body 70 defines cut-outs 78 that provide a space 77 for the pivot gears 76. Each cut-out 78 forms a vertical series of teeth 80 that engages the teeth 79 of the pivot gears 76. As such, as the body 70 moves upwardly and downwardly the teeth 80 engage the pivot gears 76 pivoting them to open and close the louvers 26.

The body 70 includes a longitudinal slit 98 that is engaged by the tab 96. Indeed, the tab 96 is positioned through the slit 98 which defines longitudinal ends 101 and 103. As the tab 96 is moved during rotation of the second gear 66 described above, the tab 96 rotates along with the inner side 86 of the gear 66 sliding towards either one of the longitudinal ends 101 or 103 depending on the direction of rotation pushing the ends 101 or 103 upwards thereby lifting the rack 68 or downwards thereby lowering the rack 68. The foregoing upwards/downwards movement of the rack 68 causes the pivot gears 76 to rotate in one direction or the other which in turn causes the louvers to open or close.

In this way, the external operator 38 and the internal actuation assembly 36 are physically isolated as their communication is due to magnetism rather than to a mechanical connection. This provides for isolating and sealing the internal components of the unit 10 and avoiding openings or apertures which may affect the internal contents. This also avoids using any other pulleys, strings, ropes or beads to connect the louvers 26.

The various features described herein can be combined in a variety of ways within the context of the present disclosure so as to provide still other embodiments. As such, the embodiments are not mutually exclusive. Moreover, the embodiments discussed herein need not include all of the features and elements illustrated and/or described and thus partial combinations of features can also be contemplated. Furthermore, embodiments with less features than those described can also be contemplated. It is to be understood that the present disclosure is not limited in its application to the details of construction and parts illustrated in the accompanying drawings and described hereinabove. The disclosure is capable of other embodiments and of being practiced in various ways. It is also to be understood that the phraseology or terminology used herein is for the purpose of description and not limitation.

Hence, although the present disclosure has been provided hereinabove by way of non-restrictive illustrative embodiments thereof, it can be modified, without departing from the scope, spirit and nature thereof and of the appended claims.

What is claimed is:

1. A louver-blind double glazed window unit comprising:

a frame structure defining first and second faces of the unit, and outer side and inner sides, the frame structure comprising a first pair of opposite frame parts interconnected by a second pair of opposite frame parts, one of the second pair of opposite frame parts defining an operating frame part comprising an inner frame member and an outer frame member defining a longitudinal operating space therebetween;

a first window mounted to the first face of the unit and a second window mounted to the second face of the unit, the first and second windows and the frame structure defining an inner chamber therebetween;

a plurality of louver members extending within the chamber each of the louver members extending between and being pivotally mounted to the second pair of opposite frame parts at respective longitudinal ends thereof, one of the longitudinal ends of each of the louver members comprising a pivot gear extending through the inner frame member into the longitudinal operating space;

an actuator assembly positioned within the longitudinal operating space and being in operative communication with the plurality of louver members for imparting a pivot movement thereto between open and closed positions thereof, the actuator assembly comprising:

a monolithic single-piece and longitudinal inner movable structure comprising a carrier body comprises a frame defining a socket for fitting an inner magnet therein positioned at the inner side of the frame and a longitudinal rack contiguously extending therefrom defining a front face and a rear face with teeth, the inner movable structure being reciprocally movable along a length of the longitudinal operating space;

a longitudinal flat body positioned on the inner frame member and being reciprocally movable thereon and along a length thereof, the longitudinal flat body defining cut-outs providing respective spaces for the pivot gear of each of the louver members, each of the cut-outs providing for engaging the respective pivot gear of each of the louver members for imparting a pivot movement thereto during reciprocal movement of the longitudinal flat body;

a gear assembly comprising a housing including a first gear and a second gear engaged by the first gear and comprising a rotatable tab member extending therefrom and being positioned within a longitudinal slit opening formed in the longitudinal flat body and defining opposite slit ends, the housing defining a longitudinal slot for receiving a distal portion of the longitudinal rack to provide the teeth of the longitudinal rack to engage corresponding gear teeth of the first gear thereby providing the gear assembly to be operatively engaged by the rigid longitudinal rack during reciprocal movement of the inner movable structure; and an external manual operator movably positioned on the outer side of the frame structure and comprising an outer magnet interfacing with the inner magnet via the frame structure for magnetic communication therewith, wherein a movement of the external manual operator along a length of the outer side of the frame causes the inner magnet to move in tandem with the outer magnet causing the inner movable structure to move therewith for the teeth of the distal portion of longitudinal rack to operatively engage the first gear for rotation thereof thereby rotating the second gear together with the rotatable tab member, the rotatable tab member reciprocally sliding from one of the opposite slits end to the other opposite slit end during rotation thereof for moving the longitudinal flat body along the length of the inner member to engage the respective pivot gear of each of the louver members for imparting a pivot movement thereto, wherein movement of the external manual operator in one linear direction along the length of the outer side of the frame causes reciprocal movement of the longitudinal flat body thereby causing the louver blinds to reciprocally pivot between both the open and the closed positions during external manual operator movement in the same one linear direction and wherein movement of the external manual operator in an opposite direction along the length of the outer side of the frame causes reciprocal movement of the longitudinal flat body causing the louver blinds to reciprocally pivot between both the open and closed positions during external manual operator movement in the same one linear direction.

2. The louver-blind double glazed window unit according to claim 1, wherein each of the cut-outs defined define teeth for operatively engaging the pivot gears.

3. A louver-blind structure for a double-glazed window unit comprising a frame structure defining first and second faces of the unit, and outer side and inner sides, the frame structure comprising a first pair of opposite frame parts interconnected by a second pair of opposite frame parts, one of the second pair of opposite frame parts defining an operating frame part comprising an inner frame member and an outer frame member defining a longitudinal operating space therebetween, a first window mounted to the first face of the unit and a second window mounted to the second face of the unit, the first and second windows and the frame structure defining an inner sealed chamber therebetween, the structure comprising:

a plurality of louver members extending within the chamber each of the louver members extending between and being pivotally mounted to the second pair of opposite frame parts at respective longitudinal ends thereof, one of the longitudinal ends of each of the louver members comprising a pivot gear extending through the inner frame member into the longitudinal operating space;

an actuator assembly positioned within the longitudinal operating space and being in operative communication with the plurality of louver members for imparting a pivot movement thereto between open and closed positions thereof, the actuator assembly comprising:

a monolithic single-piece and longitudinal inner movable structure comprising a carrier body comprises a frame defining a socket for fitting an inner magnet therein positioned at the inner side of the frame and a longitudinal rack contiguously extending therefrom defining a front face and a rear face with teeth, the inner movable structure being reciprocally movable along a length of the longitudinal operating space;

a longitudinal flat body positioned on the inner frame member and being reciprocally movable thereon and along a length thereof, the longitudinal flat body defining cut-outs providing respective spaces for the pivot gear of each of the louver members, each of the cut-outs providing for engaging the respective pivot gear of each of the louver members for imparting a pivot movement thereto during reciprocal movement of the longitudinal flat body;

a gear assembly comprising a housing including a first gear and a second gear engaged by the first gear and comprising a rotatable tab member extending therefrom and being positioned within a longitudinal slit opening formed in the longitudinal flat body and defining opposite slit ends, the housing defining a longitudinal slot for receiving a distal portion of the longitudinal rack to provide the teeth of the longitudinal rack to engage corresponding gear teeth of the first gear thereby providing the gear assembly to be operatively engaged by the rigid longitudinal rack during reciprocal movement of the inner movable structure; and an external manual operator movably positioned on the outer side of the frame structure and comprising an outer magnet interfacing with the inner magnet via the frame structure for magnetic communication therewith, wherein a movement of the external manual operator along a length of the outer side of the frame causes the inner magnet to move in tandem with the outer magnet causing the inner movable structure to move therewith for the teeth of the distal portion of longitudinal rack to operatively engage the first gear for rotation thereof thereby rotating the second gear together with the rotatable tab member, the rotatable tab member reciprocally sliding from one of the opposite slits end to the other opposite slit end during rotation thereof for moving the longitudinal flat body along the length of the inner member to engage the respective pivot gear of each of the louver members for imparting a pivot movement thereto, wherein movement of the external manual operator in one linear direction along the length of the outer side of the frame causes reciprocal movement of the longitudinal flat body thereby causing the louver blinds to reciprocally pivot between both the open and the closed positions during external manual operator movement in the same one linear direction and wherein movement of the external manual operator in an opposite direction along the length of the outer side of the frame causes reciprocal movement of the longitudinal flat body causing the louver blinds to reciprocally pivot between both the open and closed positions during external manual operator movement in the same one linear direction.

4. The louver-blind double structure according to claim 3, wherein each of the cut-outs defined define teeth for operatively engaging the pivot gears.

5. A kit for a louver-blind double glazed window unit, the kit comprising:

a frame structure defining first and second faces of the unit, and outer side and inner sides, the frame structure comprising a first pair of opposite frame parts interconnected by a second pair of opposite frame parts, one of the second pair of opposite frame parts defining an operating frame part comprising an inner frame member and an outer frame member defining a longitudinal operating space therebetween;

a first window mounted to the first face of the unit and a second window mounted to the second face of the unit, the first and second windows and the frame structure defining an inner chamber therebetween;

a plurality of louver members extending within the chamber each of the louver members extending between and being pivotally mounted to the second pair of opposite frame parts at respective longitudinal ends thereof, one of the longitudinal ends of each of the louver members comprising a pivot gear extending through the inner frame member into the longitudinal operating space;

an actuator assembly positioned within the longitudinal operating space and being in operative communication with the plurality of louver members for imparting a pivot movement thereto between open and closed positions thereof, the actuator assembly comprising:

a monolithic single-piece and longitudinal inner movable structure comprising a carrier body comprises a frame defining a socket for fitting an inner magnet therein positioned at the inner side of the frame and a longitudinal rack contiguously extending therefrom defining a front face and a rear face with teeth, the rigid inner movable structure being reciprocally movable along a length of the longitudinal operating space;

a longitudinal flat body positioned on the inner frame member and being reciprocally movable thereon and along a length thereof, the longitudinal flat body defining cut-outs providing respective spaces for the pivot gear of each of the louver members, each of the cut-outs providing for engaging the respective pivot gear of each of the louver members for imparting a pivot movement thereto during reciprocal movement of the longitudinal flat body;

a gear assembly comprising a housing including a first gear and a second gear engaged by the first gear and comprising a rotatable tab member extending therefrom and being positioned within a longitudinal slit opening formed in the longitudinal flat body and defining opposite slit ends, the housing defining a longitudinal slot for receiving a distal portion of the longitudinal rack to provide the teeth of the longitudinal rack to engage corresponding gear teeth of the first gear thereby providing the gear assembly to be operatively engaged by the rigid longitudinal rack during reciprocal movement of the inner movable structure; and an external manual operator movably positioned on the outer side of the frame structure and comprising an outer magnet interfacing with the inner magnet via the frame structure for magnetic communication therewith, wherein a movement of the external manual operator along a length of the outer side of the frame causes the inner magnet to move in tandem with the outer magnet causing the inner movable structure to move therewith for the teeth of the distal portion of longitudinal rack to operatively engage the first gear for rotation thereof thereby rotating the second gear together with the rotatable tab member, the rotatable tab member reciprocally sliding from one of the opposite slits end to the other opposite slit end during rotation thereof for moving the longitudinal flat body along the length of the inner member to engage the respective pivot gear of each of the louver members for imparting a pivot movement thereto, wherein movement of the external manual operator in one linear direction along the length of the outer side of the frame causes reciprocal movement of the longitudinal flat body thereby causing the louver blinds to reciprocally pivot between both the open and the closed positions during external manual operator movement in the same one linear direction and wherein movement of the external manual operator in an opposite direction along the length of the outer side of the frame causes reciprocal movement of the longitudinal flat body causing the louver blinds to reciprocally pivot between both the open and closed positions during external manual operator movement in the same one linear direction.

6. The kit according to claim 5, wherein each of the cut-outs defined define teeth for operatively engaging the pivot gears.

* * * * *